Feb. 12, 1957 L. S. THORNES ET AL 2,781,322
TREATMENT OF OIL CONTAMINATED CLAY
Filed Nov. 26, 1952
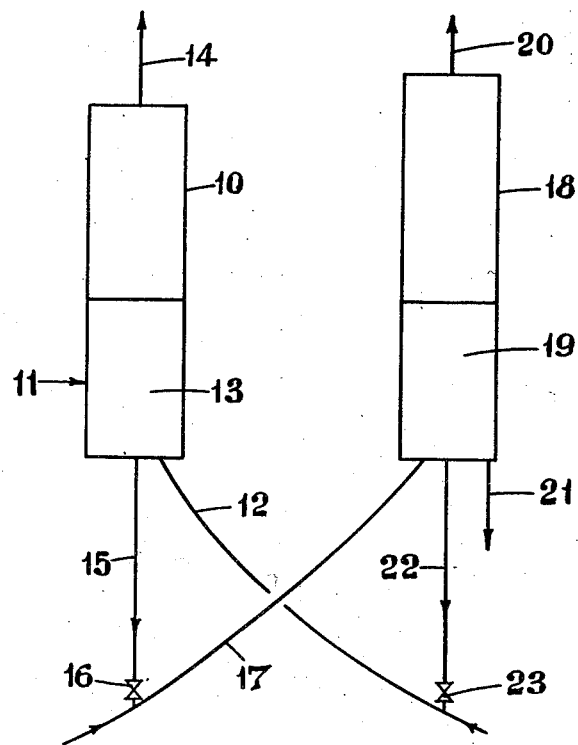
INVENTORS:
LESLIE SENIOR THORNES
ROY TURNER
JOHN WELFORD HYDE
BY
*Morgan, Finnegan & Durham*
ATTORNEYS

United States Patent Office 2,781,322
Patented Feb. 12, 1957

2,781,322

TREATMENT OF OIL CONTAMINATED CLAY

Leslie Senior Thornes, Roy Turner, and John Welford Hyde, Sunbury-on-Thames, England, assignors to The British Petroleum Company Limited Application November 26, 1952, Serial No. 322,724

Claims priority, application Great Britain December 7, 1951

2 Claims. (Cl. 252—417)

This invention relates to the treatment of oil-contaminated clay and more particularly to the treatment of spent clay from the refining of lubricating oil.

The disposal of spent clay from the refining of lubricating oil constitutes a difficult problem because of the relatively high oil content which is at least 20% by weight and probably as much as 50% by weight. Dumping is generally not possible because of oil seepage from the clay, and removal of oil from the clay by naphtha washing is costly.

It is an object of this invention to provide a process for removing oil from oil-contaminated spent clay from the refining of lubricating oil which is cheap and easy to operate and which produces a substantially oil- and carbon-free clay which may be easily disposed of or put to further use as required.

According to the invention, oil-contaminated spent clay from the refining of lubricating oil is fed at substantially ambient temperature into a distillation zone into the base of which a stream of air and hot clay is also injected at a rate sufficient to allow a portion of the oil to burn and provide the balance of heat required to vaporise the remainder of the oil, whereby the injected air and vaporised oil maintain the clay in the form of a fluidised bed from which substantially oil-free, carbon-contaminated, clay is continuously removed and circulated in another stream of air into a regeneration zone where the carbon is burned off the clay which is maintained by the air in the form of a fluidised bed from which hot, carbon-free clay is continuously removed, a portion of it being injected into a stream of air to constitute the aforementioned stream of air and hot clay fed to the base of the distillation zone, the hot clay providing part of the heat requirements of that zone.

According to the invention furthermore, in the treatment of the oil-contaminated spent clay from the refining of lubricating oil, the air and clay feed rates are adjusted so as to maintain the temperature in the distillation zone between 800 and 1100° F.

The oil vapours leaving the distillation zone may be condensed and a portion of the recovered oil may be mixed with the clay feed so as to form a pumpable slurry and facilitate its injection into the distillation zone.

The temperature in the distillation zone may easily be controlled by adjusting the rate of injection of air and hot regenerated clay. By so varying the temperature it is possible to control the amount of thermal and catalytic cracking which takes place and in this way a considerable portion of the oil may be recovered as gasoline.

The invention will now be described by way of example with reference to the accompanying diagrammatic drawing.

The spent clay is mixed with sufficient recovered oil (referred to later) so as to form a slurry and is pumped into distillation reactor 10 via line 11. Sufficient air, together with hot recovered clay (also referred to later) is injected into the base of reactor 10 via line 12 to allow enough of the oil to burn and provide the necessary, additional heat required to vaporise the remainder of the oil. The volume of air required together with the oil vapour produced are adequate to maintain the clay in the form of a fluid bed 13 and accurate temperature control can easily be maintained by changes of air rate. Oil vapours and combustion products leave from the top of reactor 10 by line 14 while oil-free clay, containing some 10% by weight of carbon, leaves by line 15 which is provided with a valve 16 so as to enable the amount of clay leaving to be controlled.

The clay passing through valve 16 is carried by a stream of air along line 17 into carbon-burning reactor 18 where the carbon is burned off the clay. The rate of injection of air through line 17 is sufficient to maintain a fluid bed of clay 19 in reactor 18. Flue gas leaves from the top of the reactor via line 20 and recovered, carbon-free clay leaves via line 21. A portion of the hot clay from reactor 18 may be recycled via line 22 and valve 23 into admixture with the air passing along line 12 into reactor 10 so as to provide part of the heat requirements of reactor 10.

The oil vapours leaving reactor 10 via line 14 are condensed and a portion is mixed with the spent clay feed so as to form a pumpable slurry. The remainder of the oil is recovered as gasoline and fuel oil.

The clay leaving reactor 18 via line 21 is cooled and may be put to further use.

We claim:

1. A process for recovering substantially oil- and carbon-free clay from oil-contaminated spent clay from the refining of lubricating oil comprising feeding the oil-contaminated clay at substantially ambient temperature continuously into a distillation zone to form and maintain a fluidized bed of clay therein, injecting a stream of hot air and hot clay into the distillation zone at a rate sufficient to maintain a temperature of about 800°–1100° F. and to burn a portion of the oil and to continuously provide the whole of the heat necessary to vaporize the remainder of the oil whereby the injected air and vaporized oil maintain the clay bed in a fluidized state, continuously removing the vaporized oil from the top of the distillation zone, condensing the oil vapors and recycling a portion of the recovered oil into admixture with spent clay feed to form a pumpable slurry, continuously removing substantially oil-free, carbon-contaminated clay from the fluidized bed in the distillation zone and passing same in a stream of air into a regeneration zone to form and maintain a fluidized bed of clay, and where the carbon is burned off the clay, continuously removing substantially carbon-free clay from the regeneration zone, injecting a portion of the recovered clay into a stream of air to constitute the stream of air and hot clay fed into the distillation zone for providing a portion of the heat requirements of that zone, and recovering the remainder of the regenerated clay.

2. A process according to claim 1, in which a gasoline fraction is separated from the oil vapours leaving the distillation zone.

References Cited in the file of this patent

UNITED STATES PATENTS

| | | |
|---|---|---|
| 2,351,793 | Voorhees | June 20, 1944 |
| 2,382,755 | Tyson | Aug. 14, 1945 |
| 2,409,234 | Arveson | Oct. 15, 1946 |
| 2,451,619 | Hengstebeck et al. | Oct. 19, 1948 |
| 2,457,255 | McElharne | Dec. 28, 1948 |
| 2,666,732 | McConnell | Jan. 19, 1954 |
| 2,666,733 | Scovill | Jan. 19, 1954 |